March 20, 1945. S. D. POOL ET AL 2,371,842
TRACTOR IMPLEMENT
Filed Dec. 27, 1943 3 Sheets-Sheet 2
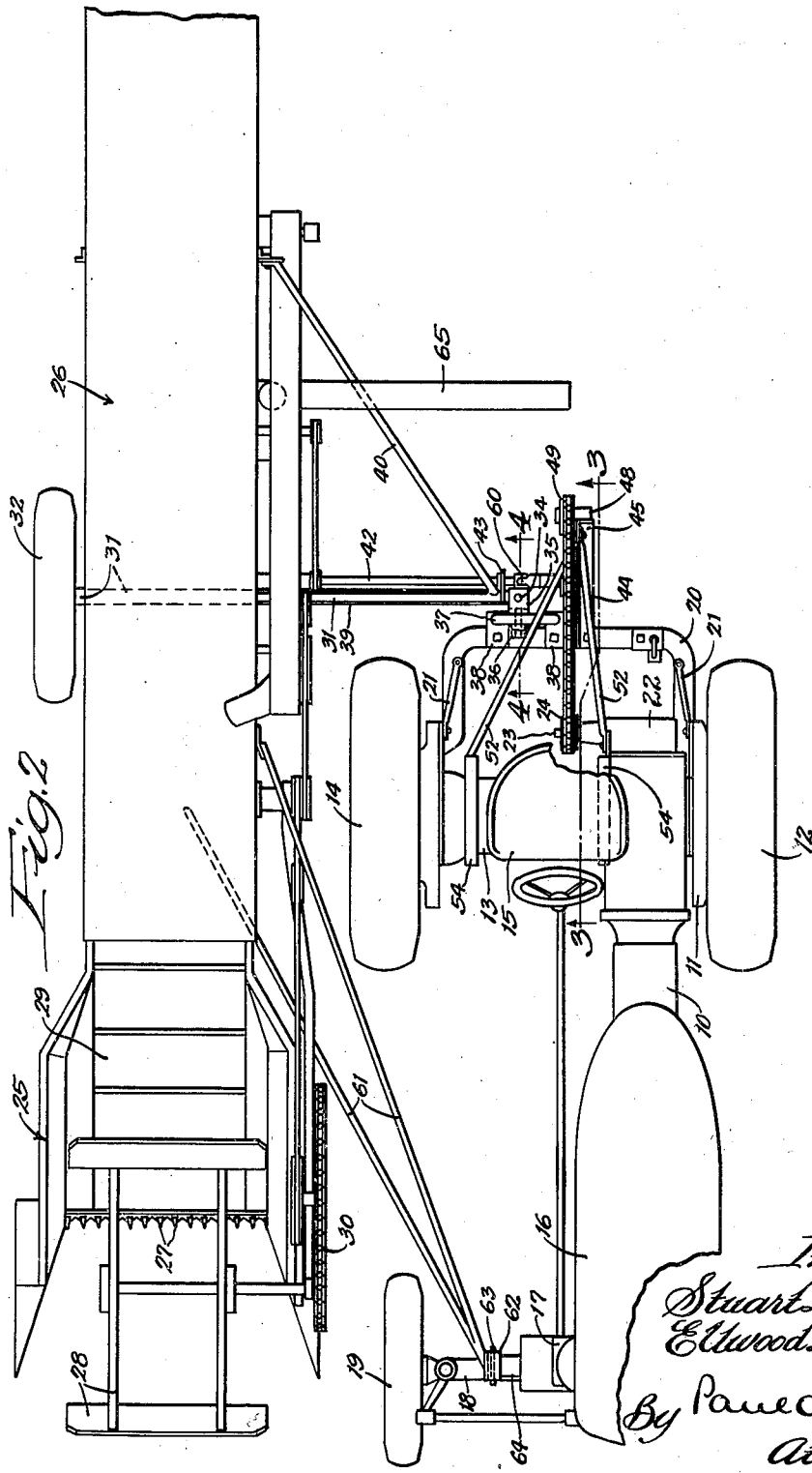

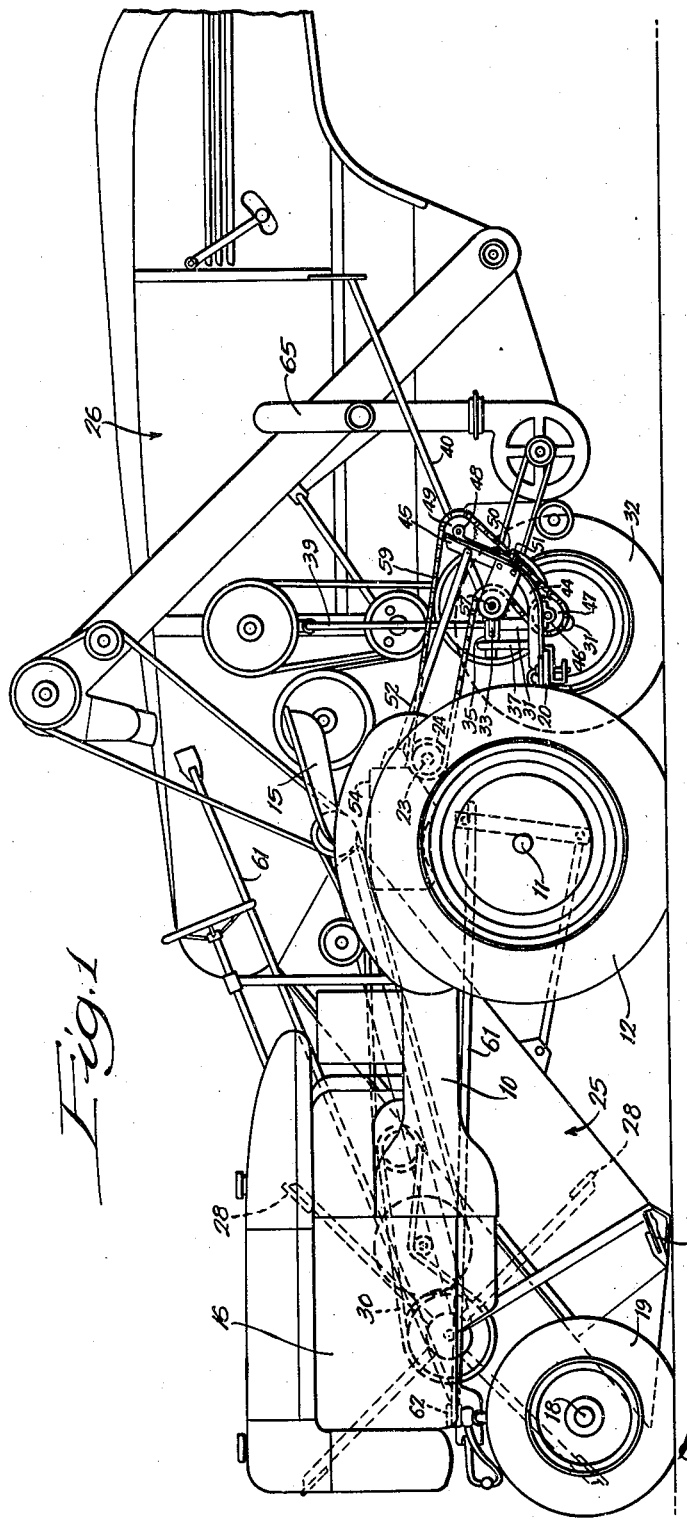

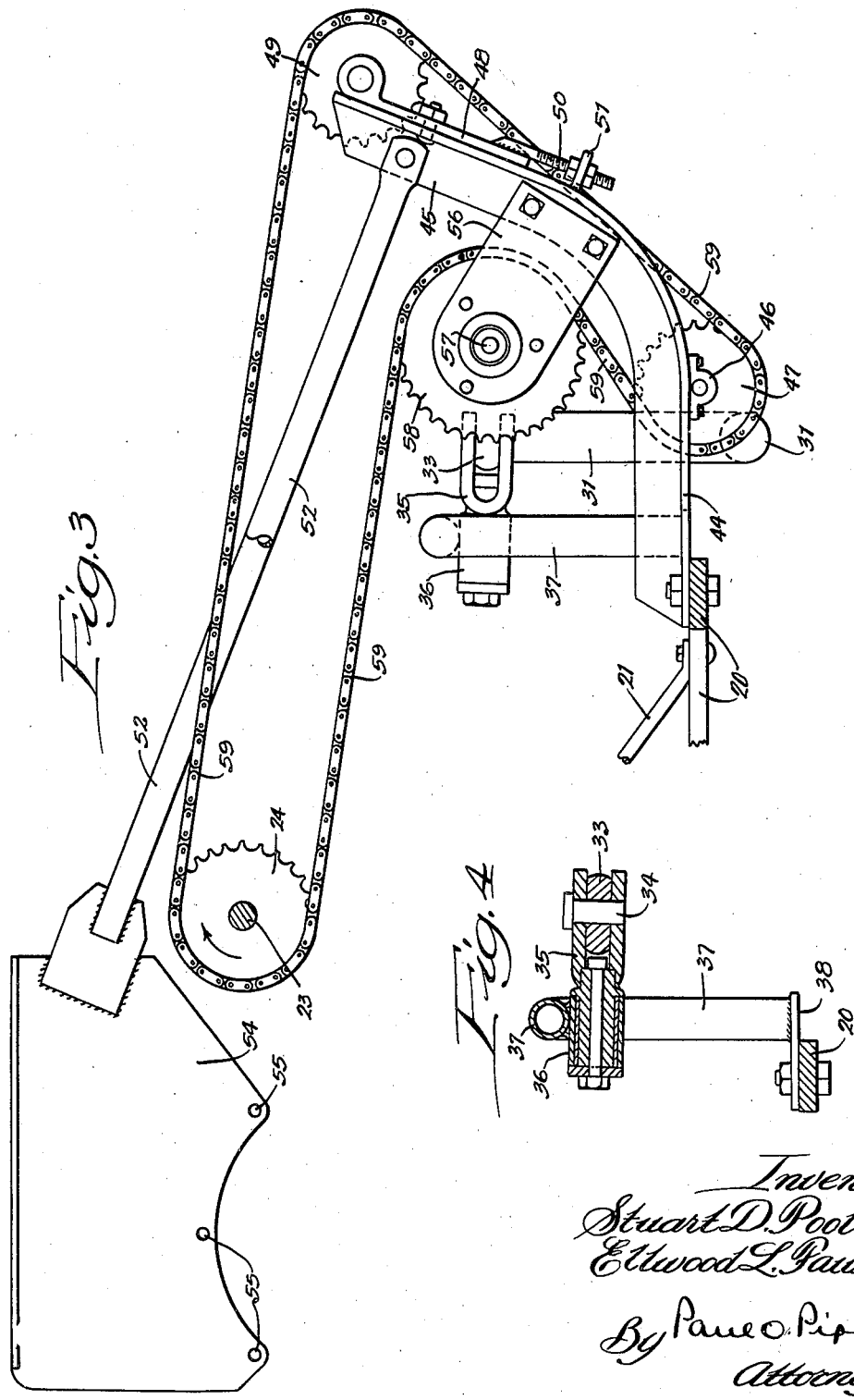

Patented Mar. 20, 1945

2,371,842

UNITED STATES PATENT OFFICE 2,371,842

TRACTOR IMPLEMENT

Stuart D. Pool and Ellwood L. Faust, Moline, Ill., assignors to International Harvester Company, a corporation of New Jersey Application December 27, 1943, Serial No. 515,632

10 Claims. (Cl. 180—14)

This invention relates to a driving mechanism for a tractor-mounted agricultural implement. More specifically, it relates to a flexible drive construction for an implement floatingly mounted at the side of a tractor.

The principal object of the invention is to provide a power drive mechanism adapted to be mounted at the rear of the tractor for supplying power to a disconnected implement.

A more specific object is to provide a power drive mechanism adapted to be mounted on a standard tractor drawbar and to receive power from a standard power take-off device on the tractor.

Another object is to provide a combined implement support and drive structure which may be readily connected to a tractor and removed therefrom.

Other objects, and the construction by means of which they are attained, will be evident in the detailed description to follow.

Figure 1 is a side elevation of a tractor with a side-connected implement attached thereto in which the power drive mechanism of the invention is incorporated;

Figure 2 is a plan view of the structures shown in Figure 1;

Figure 3 is a section taken on the line 3—3 of Figure 2; and

Figure 4 is a section taken on the line 4—4 of Figure 2.

The tractor illustrated is of the four-wheel, offset type. A narrow body 10 has a short rear axle extension 11 at one side which carries a traction wheel 12. A relatively wider rear-axle structure 13 at the other side carries a traction wheel 14. A seat 15 is illustrated mounted above the axle structure 13. A power plant with its accessories, indicated by the reference character 16, is mounted at the forward end of the body, or frame, 10. An offset bracket structure 17 at the front of the frame 10 provides means for mounting the front axle 18, which carries a pair of steerable wheels 19. A standard U-shaped draw-bar 20, extending rearwardly from the tractor and transversely thereacross, is connected to the axle structures 11 and 13, being held in horizontal position by braces 21. Said draw-bar provides an implement-attaching structure as will be hereinafter described. A housing 22 at the rear of the tractor contains power take-off mechanism including a laterally-projecting shaft 23 on which a drive sprocket 24 is mounted to be used in connection with the power drive mechanism of this invention.

The side-mounted implement illustrated is a harvester-thresher and includes a harvester unit 25 at the front and a thresher unit 26 at the rear. These units may be of any conventional construction adapted to the size required for an implement of this type. The front unit 25, which includes cutter-bar mechanism 27, a reel 28, and a conveyor 29, may be hingedly connected to the thresher or separator unit 26, as is conventional practice. Certain of the driving mechanism for the elements of the harvester unit are shown including a chain 30 for driving the reel.

The thresher unit 26 may incorporate any type of frame structure. Such structure is not visible in the drawings as the sheet-metal body portions of the unit cover up the frame elements. Certain significant elements of the frame structure, which are utilized for supporting the implement and for attaching it to the tractor, are shown.

An axle 31, extending transversely beneath the thresher unit 26, is adapted to support the entire weight of the implement. A ground wheel 32, beyond the other side of the implement, carries the weight at that side. The axle 31 extends beyond the other side of the thresher body, being bent upwardly, as indicated in Figure 3, and flattened on the end to provide an attaching element 33. Said element 33 is pivoted by a pin 34 on a member 35, which is journaled in a sleeve 36 carried by an inverted U-shaped support 37 extending upwardly from base plates 38 by means of which it is attached to the draw-bar 20. Additional frame members 39 and 40 extending from the harvester body join the bent-up end portion of the axle 31 to provide a tripod support for the implement. A bracket 43, secured to the bent-up end portion of the axle 31 near its pivot axis on the member 35, forms a journal for one end of a drive shaft 42 extending laterally from the thresher body. Said shaft is adapted to drive the entire mechanism of the harvester thresher by means of belts, pulleys, and other mechanism of a conventional nature, some of which are illustrated on the side of the harvester body in Figure 1.

As best shown in Figures 3 and 4, a bracket member 44, in the form of an angle bar, has a horizontal portion secured to the draw-bar 20 extending rearwardly therefrom and being curved upwardly to provide a substantially vertical securing portion 45. A bearing bracket 46 provides means for journaling an idler sprocket 47 on the lower portion of the bracket member 44. A vertically slidable bearing member 48 provides means for adjustably securing an idler sprocket 49 at the upper portion of the bracket member 44. Said member is provided with a threaded member 50 by means of which the member may be adjustable with respect to an ear 51 projecting from the vertical portion 45 of the bracket member 44. To rigidly secure the bracket 44 in position on the draw-bar for supporting the power transmission elements, a pair of diverging brace bars 52 are secured to the upper portion of said member and to the rear axle structure of the tractor. Figure 3 illustrates one connection as being in the form of a plate 54 provided with a plurality of apertures 55, by means of which the plates may be secured to the axle structure.

An upwardly and forwardly-extending bracket 56, secured to the bracket member 44, is provided with means for the journaling of a stub shaft 57 thereon, said shaft carrying a drive sprocket 58. A drive chain 59, extending from the sprocket 24 on the power take-off shaft 23, extends over and around the adjustable sprocket 49, forwardly and downwardly around the idler sprocket 47, rearwardly and upwardly around to the rear of the drive sprocket 58 and back to the sprocket 24. By means of this reverse wrap construction of the driving chain, the stub shaft 57 is driven in the desired direction opposite to the direction of rotation of the power take-off shaft 23. By means of the location of the two idlers as shown, a large periphery of wrap is obtained around the driving sprocket 24 and the driven sprocket 58, whereby a satisfactory long life for the driving chain and sprockets is obtained. The location of the adjustable sprocket 49 is such that the adjustment is very accessible to an operator from a standing position at the rear of the tractor.

The stub shaft 57 is connected by an universal joint assembly 60 to the drive shaft 42, previously referred to, said shafts being in axial alinement and the universal joint being substantially in longitudinal alinement with the pivoting axis of the member 35 on its support 37. This construction provides a flexible drive at the rear of the attached implement.

To provide another point of connection, two forwardly-extending frame members 61 are joined together to an attaching member 62, which is joined by a pivot pin 61 to an attaching member 64 extending laterally from the offset portion 17 of the tractor frame. The axis of the pin 63 is substantially in longitudinal alinement with the pivoting axis of the member 35 on its support.

It will be noted that a grain discharge spout 65 has been shown in Figures 1 and 2. It is contemplated that a wheeled grain receptacle will be pulled behind the tractor to receive grain from this delivery means. Said grain receptacle and its structure are not a part of this invention, being disclosed in the co-pending application Serial Number 515,671, filed Dec. 27, 1943.

The functioning of the parts making up the power drive mechanism and the implement mounting means, has been explained in connection with the description of the parts.

It is to be understood that applicants claim as their invention all modifications falling within the scope of the appended claims.

What is claimed is:

1. A mounting means and drive construction for a side-mounted implement comprising, in combination with a tractor having a power take-off shaft and a rearwardly extending implement-attaching structure and an implement mounted along the side of the tractor and having a connecting frame structure extending laterally therefrom to the implement-attaching structure, a stub shaft journaled on said attaching structure, means for driving said shaft from the tractor power take-off shaft, the frame structure of the implement being pivotally connected to the attaching structure on a longitudinal axis, a driven shaft mounted on the implement frame structure in alinement with the stub shaft, and a universal joint connecting said shafts, said universal joint being in substantial longitudinal alinement with the pivot axis of the frame structure on the attaching structure.

2. A mounting means and drive construction for a side-mounted implement comprising, in combination with a tractor having a power take-off shaft and a rearwardly extending implement-attaching structure and an implement hingedly connected on a longitudinal axis to the side of the tractor at the front thereof and having a connecting frame structure extending laterally therefrom to the attaching structure, a stub shaft journaled on the attaching structure, means for driving said shaft from the tractor power take-off shaft, the frame structure of the implement being pivotally connected to the attaching structure on a longitudinal axis, a driven shaft mounted on the implement frame structure in alinement with the stub shaft, and a universal joint connecting said shafts, said universal joint being in substantial longitudinal alinement with the pivot axis of the frame structure on the attaching structure.

3. A mounting means and drive construction for a side-mounted implement comprising, in combination with a tractor having a power take-off shaft and a rearwardly extending implement-attaching structure, and an implement mounted along the side of the tractor and having a connecting frame structure extending laterally therefrom to a point behind the attaching structure, a stub shaft journaled on the attaching structure, means for driving said shaft from the tractor power take-off shaft, a support mounted on the attaching structure, an implement connecting member journaled on said support on a longitudinal axis, the frame structure of the implement being connected to said member, a driven shaft mounted on the implement frame structure in alinement with the stub shaft, and a universal joint connecting said shafts, said universal joint being in substantially longitudinal alinement with the journal axis of the implement-connecting member on its support.

4. A mounting means and drive construction for a side-mounted implement comprising, in combination with a tractor having a power take-off shaft and a rearwardly extending implement-attaching structure, and an implement mounted along the side of the tractor and having a connecting frame structure extending laterally therefrom to a point behind the attaching structure, a stub shaft journaled on the attaching structure, means for driving said shaft from the tractor power take-off shaft, a support mounted on the attaching structure, an implement-connecting member journaled on said support on a longitudinal axis, the frame structure of the implement being pivotally connected to said member on a vertical axis, a driven shaft mounted on the implement frame structure in alinement with the stub shaft, and a universal joint connecting said shafts, said universal joint being in substantial longitudinal alinement with the journal axis of the implement-connecting member on its support.

5. A mounting means and drive construction for a side-mounted implement comprising, in combination with a tractor having a power take-off shaft and a rearwardly extending implement-attaching structure, and an implement mounted along the side of the tractor and having a connecting frame structure extending laterally therefrom to a point behind and above the attaching structure, a stub shaft journaled on said attaching structure, means for driving said shaft from the tractor power take-off shaft, an implement-connecting member journaled on said attaching structure on a longitudinal axis, the frame structure of the implement being connected to said member, a driven shaft mounted on the implement frame structure in alinement with the stub shaft, and a universal joint connecting said shafts, said universal joint being in substantial longitudinal alinement with the journal axis of the implement-connecting member on the attaching structure.

6. A mounting means and drive construction for a side-mounted implement comprising, in combination with a tractor having a laterally extending power take-off shaft and a rearwardly extending draw-bar and an implement mounted along the side of the tractor and having a connecting frame structure extending laterally therefrom to a point behind the draw-bar, attaching structure secured to the draw-bar, a stub shaft journaled on said structure, a drive sprocket mounted on said shaft, a sprocket mounted on the tractor power take-off shaft, a drive chain extending between said sprockets, an implement-connecting member journaled on the attaching structure on a longitudinal axis, the frame structure of the implement being connected to said member, a driven shaft mounted on the implement frame structure in alinement with the stub shaft, and a universal joint connecting said shafts, said universal joint being in substantial longitudinal alinement with the journal axis of the implement-connecting member on the attaching structure.

7. A mounting means and drive construction for a side-mounted implement comprising, in combination with a tractor having a laterally-extending power take-off shaft and a rearwardly extending draw-bar, an implement mounted along the side of the tractor and having a connecting frame structure extending laterally therefrom to a point behind the tractor draw-bar, a bracket member secured to the draw-bar, a stub shaft journaled on said bracket, a drive sprocket mounted on said shaft, a sprocket mounted on the tractor power take-off shaft, a drive chain extending between said sprockets, a support mounted on the draw-bar, an implement-connecting member journaled on said support on a longitudinal axis, the laterally extending frame structure of the implement being connected to said member, a driven shaft mounted on the implement frame structure in alinement with the stub shaft on the bracket member, and a universal joint connecting said shafts, said universal joint being in substantial longitudinal alinement with the journal axis of the implement-connecting member on its support.

8. A mounting means and drive construction for a tractor side-mounted implement comprising, in combination with a tractor having a laterally extending power take-off shaft and a rearwardly extending draw-bar structure, an implement mounted along the side of the tractor and having a connecting frame structure extending laterally therefrom to a point adjacent the tractor draw-bar structure, an idler sprocket rotatably mounted on the draw-bar structure at the lower portion thereof, a second sprocket rotatably mounted on said structure at the upper portion thereof, a stub shaft journaled on said draw-bar structure at a forward location, a drive sprocket mounted on said shaft, a sprocket mounted on the tractor power take-off shaft, a drive chain extending from said sprocket rearwardly over the adjustable sprocket, thence downwardly around the lower sprocket, thence upwardly and rearwardly around the drive sprocket on the stub shaft and back to the sprocket on the power take-off shaft, an implement-connecting member journaled on the draw-bar structure on a longitudinal axis, the laterally extending frame structure of the implement being connected to said member, a driven shaft mounted on the implement frame structure in alinement with the stub shaft on the member, and a universal joint connecting said shafts, said universal joint being in substantial longitudinal alinement with the journal axis of the implement-connecting member on its support.

9. A mounting means and drive construction for a tractor side-mounted implement comprising, in combination with a tractor having a laterally extending power take-off shaft and a rearwardly extending draw-bar, an implement mounted along the side of the tractor and having a connecting frame structure extending laterally therefrom to a point behind and above the tractor draw-bar, a bracket secured to the draw-bar and extending rearwardly and upwardly therefrom, an idler sprocket rotatably mounted on said member at the lower portion thereof, a second sprocket rotatably mounted on said member at the upper portion thereof, a bracket connected to said member, a stub shaft journaled in said bracket, a drive sprocket mounted on said shaft, a sprocket mounted on the tractor power take-off shaft, a drive chain connecting said sprockets, a support mounted on the draw-bar, an implement-connecting member journaled on said support on a longitudinal axis, the laterally extending frame structure of the implement being connected to said member, a driven shaft mounted on the implement frame structure in alinement with the stub shaft on the member, and a universal joint connecting said shafts, said universal joint being in substantial longitudinal alinement with the journal axis of the implement-connecting member on its support.

10. A mounting means and drive construction for a side-mounted implement comprising, in combination with a tractor having a laterally extending power take-off shaft and a rearwardly extending draw-bar, an implement mounted along the side of the tractor and having a connecting frame structure extending laterally therefrom to a point behind and above the tractor draw-bar, a bracket member secured to the draw-bar and extending rearwardly and upwardly therefrom, an idler sprocket rotatably mounted on said member at the lower portion thereof, a second sprocket rotatably and adjustably mounted on said member at the upper portion thereof, a bracket connected to said member and extending forwardly therefrom, a stub shaft journaled in said bracket, a drive sprocket mounted on said shaft, a sprocket mounted on the tractor power take-off shaft, a drive chain extending from the power take-off sprocket over the adjustable sprocket, thence downwardly around the sprocket on the lower portion of the bracket, thence upwardly around the rear of the drive sprocket on the stub shaft and back to the power take-off sprocket, a vertically extending support mounted on the drawbar, an implement-connecting member journaled on said support on a longitudinal axis, the frame structure of the implement being pivotally connected to said member on a vertical axis, a driven shaft mounted on the implement frame structure in alinement with the stub shaft, and a universal joint connecting said shafts, said universal joint being in substantial longitudinal alinement with the journal axis of the implement connecting member on its support.

STUART D. POOL.
ELLWOOD L. FAUST.